United States Patent
Wu

(10) Patent No.: US 7,131,206 B2
(45) Date of Patent: Nov. 7, 2006

(54) JIG SAW WITH LASER ALIGNMENT SYSTEM

(75) Inventor: Shuming Wu, Nanjing (CN)

(73) Assignee: Chervon International Trading Co., Ltd., Nanjing (CN)

( * ) Notice: Subject to any disclaimer, the term of this patent is extended or adjusted under 35 U.S.C. 154(b) by 305 days.

(21) Appl. No.: 10/328,103

(22) Filed: Dec. 23, 2002

(65) Prior Publication Data

US 2003/0196337 A1  Oct. 23, 2003

(30) Foreign Application Priority Data

Apr. 23, 2002  (CN) ............................... 02220128.9

(51) Int. Cl.
  *B27B 19/02* (2006.01)
  *F21V 33/00* (2006.01)
(52) U.S. Cl. .................... 30/392; 30/394; 362/89; 362/119
(58) Field of Classification Search .......... 83/520; 30/144, 509, 392–393, 394; D8/61–69; 362/89, 119
See application file for complete search history.

(56) References Cited

U.S. PATENT DOCUMENTS

| | | | | |
|---|---|---|---|---|
| 3,457,796 A | * | 7/1969 | Leach et al. ............ | 30/393 |
| 3,504,716 A | * | 4/1970 | Bush et al. ............. | 30/123 |
| 4,450,627 A | * | 5/1984 | Morimoto ............... | 30/391 |
| 4,833,782 A | * | 5/1989 | Smith ..................... | 30/392 |
| 4,967,516 A | * | 11/1990 | Hoshino et al. ......... | D8/62 |
| 5,010,652 A | * | 4/1991 | Miletich ................. | 30/393 |
| 5,038,481 A | * | 8/1991 | Smith ..................... | 30/392 |
| 5,169,225 A | * | 12/1992 | Palm ...................... | 362/118 |
| 5,213,913 A | * | 5/1993 | Anthony et al. ......... | 429/97 |
| 5,375,495 A | * | 12/1994 | Bosten et al. ........... | 362/89 |
| 5,461,790 A | * | 10/1995 | Olstowski ............... | 30/391 |
| 5,675,899 A | * | 10/1997 | Webb ..................... | 30/392 |
| 5,949,810 A | * | 9/1999 | Star et al. ............... | 372/108 |
| D446,703 S | * | 8/2001 | Netzler ................... | D8/64 |
| 6,656,626 B1 | * | 12/2003 | Mooty et al. ........... | 429/99 |
| 6,675,912 B1 | * | 1/2004 | Carrier ................... | 173/217 |
| D486,369 S | * | 2/2004 | Keller .................... | D8/66 |
| D489,238 S | * | 5/2004 | Keller .................... | D8/64 |
| D489,239 S | * | 5/2004 | Keller .................... | D8/64 |
| 2003/0047050 A1 | * | 3/2003 | Onose et al. ........... | 30/376 |
| 2004/0003503 A1 | * | 1/2004 | McDonald .............. | 30/383 |
| 2004/0049927 A1 | * | 3/2004 | Wu ........................ | 30/123 |
| 2004/0093749 A1 | * | 5/2004 | Wu ........................ | 33/286 |

FOREIGN PATENT DOCUMENTS

DE  3922849 A  1/1991

(Continued)

*Primary Examiner*—Timothy V. Eley
*Assistant Examiner*—Jason Prone
(74) *Attorney, Agent, or Firm*—Wallenstein & Wagner, Ltd.

(57) ABSTRACT

A jig saw for more precise movement during cutting with a laser alignment system for projecting a marker onto a workpiece to align with a target line to be cut. The laser alignment system comprises a housing, a laser generator within the housing, an internal battery supplying the laser generator, a switch which is positioned within the housing and independent of the main switch to turn on and turn off the laser generator. By turning on the switch, the laser generator projects a laser beam onto the workpiece ahead of the blade in alignment with the plane of the blade. The operator only needs to align the projected laser line along a target line on the workpiece to attain the more precise cutting without concentrating his observation exactly ahead of the cutting blade.

9 Claims, 2 Drawing Sheets

FOREIGN PATENT DOCUMENTS

| | | | | | |
|---|---|---|---|---|---|
| DE | 29616604 U1 | 12/1996 | EP | 0 504 745 A1 | 9/1992 |

* cited by examiner

JIG SAW WITH LASER ALIGNMENT SYSTEM

FIELD OF THE INVENTION

The present application relates to a power saw, and more particularly, to a jig saw with optical alignment system for projecting an optical alignment marker onto a workpiece.

BACKGROUND OF THE INVENTION

The prior electric saw, particularly a jig saw, is mainly used to cut wood, steel plate, plastic and so on by a motor to reciprocate a saw blade. In order to align the saw blade with a cutting line on a workpiece, the operator must typically bring the blade into contact with the workpiece to determine if the saw is properly aligned with the cutting line. As is familiar to those skilled in the art, such a jig saw has some disadvantages. First, the operator is required to concentrate his observation exactly ahead of the cutting blade as the blade is pushed along the prescribed and prepared target line, it has to repeat this procedure several times in order to achieve proper alignment for precision, and this will result in waste of time and material. Also, the target line exactly ahead of the cutting blade may be covered by chip dust and influence the alignment of saw blade with the cutting line.

SUMMARY OF THE INVENTION

In view of the foregoing disadvantages inherent in the prior art, it is an primary object of the present invention to provide an improved power saw, particularly a jig saw with a laser alignment system for projecting an optical alignment marker onto a workpiece for more precise movement of the blade during cutting.

To attain this purpose, the present invention, especially a new and improved jig saw with a laser alignment system for more precise cutting, comprises a body, a handle, a main power switch, a blade, a motor, a rotary base plate and so on, it further comprises a laser alignment system mounted on the front of the jig saw.

The laser alignment system preferably comprises a housing, a laser generator housed within the housing, a battery to power the laser. The laser generator further comprises a laser diode, some optical elements to convert the point light projected by the laser diode to a planar beam. The laser alignment system is preferably provided on the front of the shield of the power saw, thus, it can project a planar segmented beam of light onto the workpiece ahead of the saw blade to form a laser line, and the laser beam is in alignment with the cutting saw blade. The laser alignment system further includes a switch button to turn on or turn off the laser generator, and it is independent of the main switch of the jig saw.

In the invention, the base plate has an alignment notch at its leading edge that is in alignment with the plane of the saw blade. Therefore, the laser alignment system provided on the front portion of the shield of the jig saw projects a planar beam in a line through the notch onto the workpiece within the blade plane.

It is a further object of the present invention to provide an improved jig saw with a laser alignment system with incorporated battery cells to power the laser generator.

Still yet another object of the present invention is to provide an improved jig saw with a laser alignment system that may be easily detached from the shield of the jig saw without the use of a tool in order to facilitate the replacement of battery cells.

The laser alignment system provided on the front portion of the shield of the jig saw projects a planar beam in a line onto the workpiece within the blade plane. The operator only needs to align the projected laser line along a target line on the workpiece to attain the more precise cutting without concentrating his observation exactly ahead of the cutting blade. Meanwhile, the alignment is not influenced by the pileup of chips. Additionally, the operator can turn on or turn off the laser alignment system optionally with the independent switch.

DETAILED DESCRIPTION OF THE PREFERRED EMBOCIMENT

Figure 1:
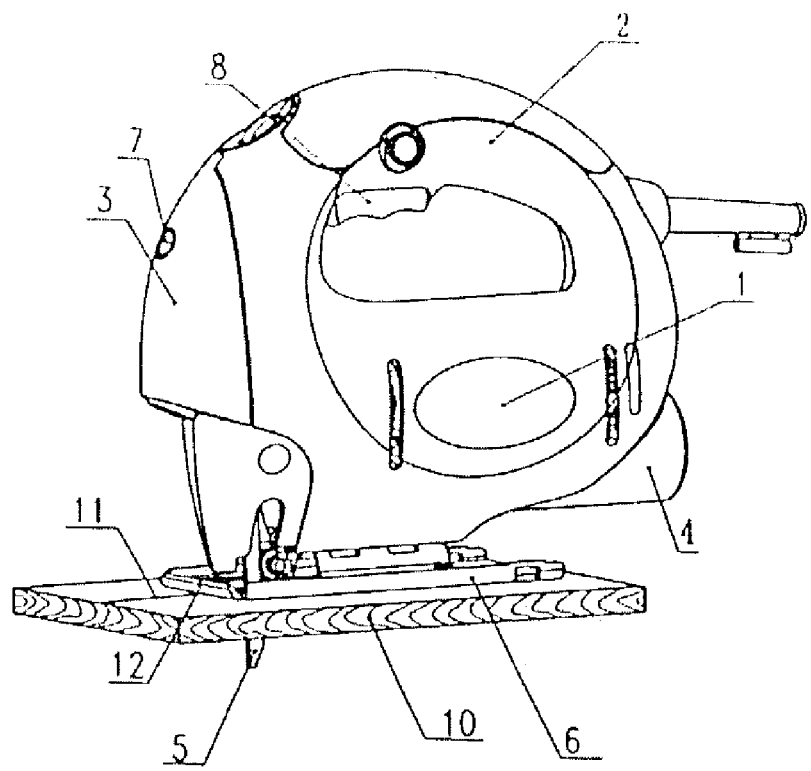
FIG. 1 illustrates a perspective view of a preferred embodiment of the jig saw with a laser alignment system mounted on the shield of the jig saw.

Referring to FIG. 1, the preferred embodiment of a new and improved jig saw with a laser alignment system comprises a body 1 with motor, a handle 2, a reciprocating saw blade 5, a base plate 6 with a lower planar surface adapted to ride on the work piece, the handle 2 also includes a main power switch trigger 8 coupled to the motor for stopping and starting the reciprocating of the saw blade 5, and a laser alignment system 3 provided on the front of the body 1, the jig saw also includes an adapter 4 for connecting a vacuum cleaner.

Figure 3:
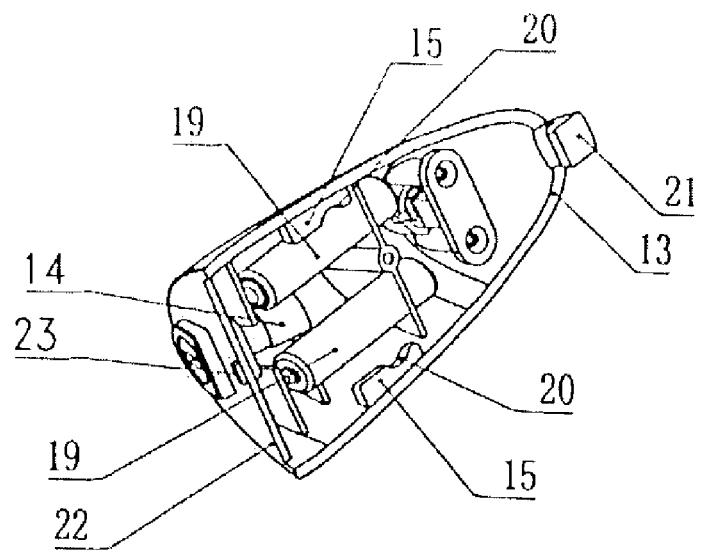
FIG. 3 illustrates the preferred construction embodiment of the laser alignment system.

Referring to FIG. 1 and FIG. 3, the laser alignment system 3 comprises a laser generator 14, a switch 7 for turning on or turning off the laser generator 14. In this preferred embodiment, the laser alignment system 3 is positioned in front of the body 1. The laser generator 14 comprises a laser diode to project a point light, and some optical elements to convert point light to a planar segmented beam. The assembly ensures the projected laser beam being aligned with the blade plane. While turning on the switch 7, the laser generator 14 will project a laser beam onto the workpiece ahead of the blade 5.

The laser alignment system 3 may also include internal battery cells or external power supply as desired, and in this preferred embodiment, an internal battery 19 is provided. The total voltage is 3–5 volts (DC), preferably 3 V (DC). It will be understood that a transformer connected to the main power of the jig saw can be used to convert the AC power to 3 to 5 volts (DC), preferably 3 V (DC).

Figure 2:
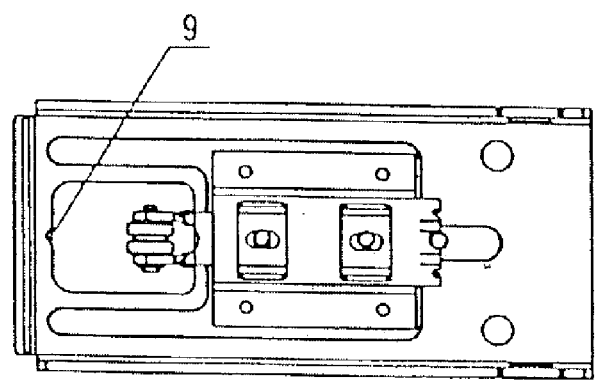
FIG. 2 illustrates a preferred blade plate with a notch at its leading edge in alignment with the plane of the blade.

Referring to FIG. 2, the base plate 6 has an alignment notch 9 at its leading edge 12 in alignment with the plane of the blade 5 when the blade is set for 90° cutting. Thus, the laser alignment system 3 may project a laser beam from the notch 9 to form a line 11 in alignment with the plane of the blade 5.

Therefore, the operator needs only to align the laser line 11 projected from the laser alignment system 3 with the target line on the workpiece 10 for more precise cutting.

Figure 4:
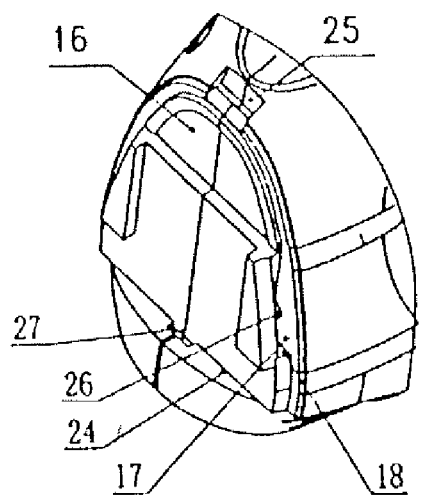
FIG. 4 illustrates a front view of the jig saw with the laser alignment system being removed.

The laser alignment system 3 can be provided on the jig saw by screws or by other fixing means. But a quick-mount means is introduced in this preferred embodiment. Referring to FIG. 3 and FIG. 4, the preferred laser alignment system 3 comprises an open housing 13 with all components of laser alignment system 3 being enclosed within this housing 13. The open contour of the housing 13 is conformed to the support surface 16 in the front of the body 1 such that the laser alignment system 3 can be mounted on the body 1 perfectly. At each side of the support surface 16 there is a groove 17 respectively, and each groove 17 has a stopper 18. Also, the housing 13 of the laser alignment system 3 has a tab 15 protruding inwardly in each side edge, each tab 15 is constructed and positioned to exactly correspond to the groove 17. The tabs 15 are introduced downwardly into the grooves 17 till the stoppers 18 stop the movement. Therefore, the laser alignment system 3 can be mounted onto the body 1 of the jig saw without using any additional tool. It is very convenient for operator to replace the exhausted battery, and also to adjust the position of the laser generator 14 if it can be adjusted.

Further, it is more reliable to introduce a number of engagement sets to obtain more perfect matching between the housing 13 of the laser alignment system 3 and the body 1 of the jig saw in above quick-mount construction. Referring to FIG. 3 and FIG. 4, a stop surface 24 is arranged in the front of the body 1 to support an underside 22 of the housing 13 and is angled intersected with the support surface 16. Meanwhile, a first recess 27 is arranged to receive a first tache 23 when the underside 22 resting on the stop surface 24 while the protruding tabs 15 stopped by the stoppers 18. Furthermore, a second recess 25 can be arranged on the top of the body 1 near the support surface 16 to adapt a second tache 21 of the housing 13 to make the seam between the body 1 and the housing 3 as small as possible. And, there can be a convex 26 in each groove 17 to adapt a concave 20 in each tab 15. The convexes 26 just plug in the concaves 20 to get a better orientation.

With the laser line projected by the laser alignment system, the operator does not have to observe the exact front cut of the saw blade as it follows the target line, but rather the operator needs only to visually align the beam with the target line to ensure the saw blade to follow the target line. Meanwhile, the alignment is not influenced by the pileup of the chips.

It will be understood by those skilled in the art that the present inventions are not limited to the examples described above, but may be changed or modified without departing from the spirit or scope of the invention. Also, it will be understood by those skilled in the art that the laser alignment system is not limited to use the battery cells as the power, and the quick-mount construction may have different configurations. Further, it will be recognized that the laser alignment system of the present invention may be provided on any suitable surface on a jig saw.

Further more, the laser alignment system of the present invention is intended to be compatible with any power saw with saw blade, including table saws, miter saws, cutoff saws, tile cutters, circular saws, and so on, with a wide variety configurations.

I claim:

1. A jig saw, comprising:
   a body;
   a handle with a main power switch trigger;
   a saw blade;
   a base plate with a lower planar surface;
   the jig saw further comprising a laser alignment system provided on a front support surface of said body, said laser alignment system being capable of projecting a planar laser beam in alignment with a plane of the blade forward onto a workpiece to be cut and backward towards the saw blade, wherein said laser alignment system comprises:
   a housing with a first and second side edge,
   a laser generator,
   a switch for controlling said laser generator,
   internal battery cells,
   wherein the support surface of the body has a first and second side, and wherein a tab protruding inwardly from each side edge of said housing to correspond to a groove on each side of said support surface, each said tab is stopped by a stopper of each said groove and an underside of said housing rests on a stop surface of said body when said tabs are stopped by said stoppers.

2. The jig saw according to claim 1, wherein a first recess arranged in said stop surface corresponds to a first tache in said underside of said housing, a second recess in said body corresponds to a second tache of said housing, in order to limit the seam between said housing and said body and to prevent said laser alignment system from loosing by the vibration during operation.

3. A jig saw, comprising:
   a body;
   a handle with a main power switch trigger;
   a saw blade;
   a base plate with a lower planar surface, wherein there is a notch inside a leading edge of said base plate to align the plane of the saw blade when the blade is set for 90° cutting;
   a laser alignment system provided on a front support surface of said body, and said laser alignment system projects a planar laser beam in alignment with a plane of the blade forward onto a workpiece to be cut and backward towards the saw blade wherein said laser alignment system comprises:
   a housing with a first and second side edge;
   a laser generator;
   a switch for controlling said laser generator;
   internal battery cells;
   the support surface of the body having a first and second side; and
   a tab protruding inwardly from each side edge of said housing to correspond to a groove on each side of said support surface, each said tab is stopped by a stopper of each said groove and an underside of said housing rests on a stop surface of said body when said tabs are stopped by said stoppers.

4. The jig saw according to claim 3, wherein a first recess arranged in said stop surface corresponds to a first tache in said underside of said housing, a second recess in said body corresponds to a second tache of said housing, in order to limit the seam between said housing and said body and to prevent said laser alignment system from loosing by the vibration during operation.

5. The jig saw according to claim 3, wherein the notch is positioned between a leading edge of the base plate and the saw blade.

6. A jig saw comprising:
   a body having a motor, a handle, and a primary switch;
   a saw blade reciprocally connected to the motor; and,
   a laser alignment system comprising a housing with a laser generator, a power source and a secondary switch, and a bottom wall with an opening therein, the housing having at least one tab that extends inward from a peripheral edge of the housing, the housing further having at least one tache that extends outward from the peripheral edge;

wherein the housing is removably secured to a support region of the body by engagement between the tab and a groove located at a side portion of the support region and by engagement between the tache and a recess located at one end of the support region: and wherein the laser generator projects a laser beam from within the housing through the opening to form a line on a workpiece to be cut during operation of the jig saw.

7. The jig saw of claim 6, wherein the tab has a concave portion and the groove has a convex portion to facilitate engagement between the housing and the body.

8. The jig saw of claim 6, wherein the groove has a stopper to prevent further movement of the tab and the housing.

9. A jig saw, comprising:

a body having a convex portion and a support surface, the support surface having a first side with a first groove and first stopper, and a second side with a second groove and second stopper;

a saw blade;

a laser alignment system with a housing and a laser generator, the housing having a first side with a first inwardly directed tab and a second side with a second inwardly directed tab and a concave portion, the first and second grooves being generally complementary to the first and second tabs, and the housing of the laser alignment system being fixedly mounted to the support surface of the body, and the first tab fitting within the first groove and being stopped by the first stopper simultaneous with the second tab fitting within the second groove and being stopped by the second stopper, and wherein the concave portion of the housing fits into the convex portion of the body.

* * * * *